US010001298B1

(12) United States Patent
Ermanoski et al.

(10) Patent No.: US 10,001,298 B1
(45) Date of Patent: Jun. 19, 2018

(54) METHODS FOR OPERATING SOLAR-THERMOCHEMICAL PROCESSES

(71) Applicant: National Technology & Engineering Solutions of Sandia, LLC, Albuquerque, NM (US)

(72) Inventors: Ivan Ermanoski, Albuquerque, NM (US); James E. Miller, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 147 days.

(21) Appl. No.: 14/962,307

(22) Filed: Dec. 8, 2015

Related U.S. Application Data

(60) Provisional application No. 62/089,052, filed on Dec. 8, 2014.

(51) Int. Cl.
| | |
|---|---|
| *C01B 3/06* | (2006.01) |
| *F24J 2/42* | (2006.01) |
| *C01B 31/20* | (2006.01) |
| *F24J 2/40* | (2006.01) |
| *F24J 2/02* | (2006.01) |

(52) U.S. Cl.
CPC ............... *F24J 2/42* (2013.01); *C01B 3/061* (2013.01); *C01B 31/20* (2013.01); *F24J 2/02* (2013.01); *F24J 2/402* (2013.01)

(58) Field of Classification Search
CPC ....... F24J 2/42; F24J 2/02; F24J 2/402; C01B 31/20; C01B 31/061
See application file for complete search history.

(56) References Cited

U.S. PATENT DOCUMENTS

| 2009/0028146 A1* | 1/2009 | Kleyman | .......... H04L 29/06027 370/389 |
| 2011/0166367 A1* | 7/2011 | Gross | ....................... B01J 8/067 549/247 |

OTHER PUBLICATIONS

N.P. Siegel, J.E. Miller, I. Ermanoski, R.B. Diver, E.B. Stechel "Factors Affecting the Efficiency of Solar-Driven Metal Oxide Thermochemical Cycles" Ind. Eng. Chem. Res., 2013, 52 (9), 3276. DOI: 10.1021/ie400193q.
J.E. Miller, A.H. McDaniel, M.D. Allendorf "Considerations in the Design of Materials for Solar-Driven Fuel Production Using Metal-Oxide Thermochemical Cycles" Adv. Energy Mater. 2014, 4, 1300469. DOI:10.1002/aenm.201300469.
Zinkevich, D. Djurovic, F. Aldinger "Thermodynamic Modelling of the Cerium-Oxygen System" Solid State Ionics, 2006;177, 989.
Panlener, R.N. Blumenthal, J.E. Garnier "A Thermodynamic Study of Nonstoichiometric Cerium Dioxide" Journal of Physics and Chemistry of Solids 1975, 36, 1213.

* cited by examiner

*Primary Examiner* — Jill A Warden
*Assistant Examiner* — Matthew D Krcha
(74) *Attorney, Agent, or Firm* — Daniel J. Jenkins

(57) ABSTRACT

Methods for controlling or operating solar thermochemical reactions process that maximize the two-step thermochemical energy cycle efficiency by a combination of pressure and temperature swing are disclosed.

14 Claims, 6 Drawing Sheets

METHODS FOR OPERATING SOLAR-THERMOCHEMICAL PROCESSES

CROSS-REFERENCE TO RELATED APPLICATIONS

This application claims benefit of U.S. Provisional Patent Application Ser. No. 62/089,052, "METHODS FOR OPERATING SOLAR-THERMOCHEMICAL REACTIONS," filed Dec. 8, 2014, which is incorporated by reference herein in its entirety.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

TECHNICAL FIELD

Embodiments of the present invention relate to solar thermochemical processes and reactions and more particularly relate to methods of thermochemical reactor operations using a combination of targeted pressure and temperature swing to efficiently operate a two-step thermochemical cycle for solar fuel production.

BACKGROUND

Solar fuel production has the potential to dramatically change the world's energy posture: from the prospecting and extraction of today, to renewable production using sunlight and atmospheric gases in the future. The issue in solar fuel production is not one of mere feasibility, as this can be accomplished via multiple pathways (e.g. thermochemical, electrochemical, even biological), but one of practical economic viability, expressed via metrics such as the levelized fuel cost, which is strongly tied to efficiency.

Solar concentration systems typically entail optics (mirrors or lenses) to focus a large area of sunlight, or solar thermal energy, onto a small area. The solar thermal energy may drive a heat engine, such as a steam turbine, which may be further coupled to an electrical power generator to convert a portion of the solar thermal energy into electricity. Solar concentration systems may also drive a thermochemical reaction to generate a fuel that chemically stores a portion of the solar thermal energy. Water splitting, gasification of coal, and reforming of methane are all under investigation as potential solar thermochemical fuel production techniques. Solar concentration systems may drive other important reactions on an industrial scale as well, such as $CO_2$ reduction into CO, for example.

Many solar thermochemical reactions entail a redox cycle. Two-step thermochemical fuel production processes are a conceptually simple approach: a working material (oxide) is partially or fully reduced at a high temperature, then cooled and, in the case of water splitting, exposed to steam to be reoxidized and yield $H_2$. The metal oxide is then reduced again to repeat the cycle. While identifying advantageous metal-oxides is currently a subject of research, thermodynamic considerations dictate the thermal reduction portion of the cycle generally requires a high temperature, typically between 1000-2000° C., depending on the reactive oxide chosen and other conditions in the system.

While two-step metal oxide cycles are promising, reduction to practice of these theoretically efficient processes has been challenging. Existing working materials, for example, have a low reversible oxygen capacity, yielding little $H_2$ per mole oxide per cycle. The large energy requirement for heating the reactive material between cycle steps necessitates solid-solid heat recovery at high temperature. Maximizing the per-cycle yield drives operation towards very low thermal reduction pressures and very high thermal reduction temperatures. The former require large vacuum pumps or high-purity sweep gasses, and the latter lead to excessive aperture radiation losses and require the use of specialized materials.

Solar thermochemical reactors in which these materials are implemented can take many forms, affording more or less efficient fuel production, operability, scalability, etc. One conventional system utilizes a honeycomb substrate that is coated with the reactive oxide. The honeycomb substrate is alternately exposed to collected solar energy to heat the system and reduce the reactive oxide, and to a reactant gas, such as $H_2O$ in the case of water splitting, to generate fuel. Such a reactor is essentially a fixed bed operating in semi-batch mode, and as such, suffers temperature non-uniformities and low thermal efficiency because much of the solar energy is expended on heating non-reactive portions of the bed (e.g., honeycomb substrate) and is ultimately rejected from the system as waste heat, rather than utilized for fuel production. Also, with each redox cycle, the entire system undergoes extreme thermal cycling, leading to component fatigue and failure.

The broad question of reactor efficiency has been examined in detail by Siegel et al., (N. P. Siegel, J. E. Miller, I. Ermanoski, R. B. Diver, E. B. Stechel "Factors Affecting the Efficiency of Solar-Driven Metal Oxide Thermochemical Cycles" Ind. Eng. Chem. Res., 2013, 52 (9), 3276. DOI: 10.1021/ie400193q) arriving at the concept of the utilization coefficient as an indicator of achievable efficiency for a reactor-material combination in a two-step thermochemical cycle. In a recent analysis Miller et al. (J. E. Miller, A. H. McDaniel, M. D. Allendorf "Considerations in the Design of Materials for Solar-Driven Fuel Production Using Metal-Oxide Thermochemical Cycles" Adv. Energy Mater. 2014, 4, 1300469. DOI:10.1002/aenm.201300469) address efficiency from an even broader thermodynamic viewpoint, and establish a framework for materials design.

The current understanding is that the cost of solar collection is a dominant overall cost factor for solar fuels in general, and for specifically proposed thermochemistry-based system designs. It is therefore of substantial importance for further progress in this field to develop methods for determining the operating and design parameter space that maximize efficiency, given a reactor type and working material properties.

Methods which avoid many of the difficulties and efficiency limitations associated with existing reactor operation would advance the art of solar thermochemical fuel production.

SUMMARY OF THE DISCLOSURE

The present disclosure is directed to methods for controlling solar thermochemical reactions and designing and operating solar thermochemical reactor. The disclosed methods incorporate a methodology for reactor design and controls/operations that maximize energy efficiency of the conversion process.

In an embodiment, methods are disclosed for a non-isothermal two-step cyclic process. In an embodiment, the non-isothermal two-step cyclic process may be non-isothermal water splitting (ITWS) or non-isothermal carbon dioxide splitting. The methods are independent of reactive material properties or reactor design making the results the most generally applicable. In an embodiment, the methods include a combination of pressure and temperature swing, rather than either individually, which emerge as the most efficient mode of operation of a two-step thermochemical cycle. In an embodiment, the methods include determining a map of the relevant operation parameter space. These methods are applicable beyond water splitting (reduction of water to $H_2$), for example to the splitting of carbon dioxide (reduction to CO).

In an embodiment, a method of operating a thermochemical reactor process is disclosed that includes setting a thermal reduction temperature, pressure and oxide mass flow for an oxide in the thermochemical reactor process, and determining an oxidation temperature and oxygen partial pressure where oxide heating requirement and heat requirement of an oxidizing feed stream are equal.

In another embodiment, a method for determining an operating oxidation temperature in a thermochemical reactor process is disclosed that includes the following steps: select a thermal reduction temperature for a reactive material; select an operating pressure in the thermal reduction step in a containment vessel; select a solid-solid and a gas-gas recuperation efficiency; select an initial oxidation temperature for a feed stream having a heat requirement for oxidizing the feed stream; iterate/repeat to develop a performance/efficiency map as a function of reduction temperature, temperature swing, pressure swing, and recuperation efficiencies; and embed the performance/efficiency map into a solar collection and heating system model to determine the operating oxidation temperature.

In yet another embodiment, a method for determining an operating oxidation temperature in a thermochemical reactor process is disclosed that includes the following steps: select a thermal reduction temperature for a reactive material; select an operating pressure in the thermal reduction step in a containment vessel; select a solid-solid and a gas-gas recuperation efficiency; select an initial oxidation temperature for a feed stream having a heat requirement for oxidizing the feed stream; iterate/repeat to develop a performance/efficiency map as a function of reduction temperature, temperature swing, pressure swing, and recuperation efficiencies; and embed the performance/efficiency map into a system cost model to determine a configuration of process system components that result in the largest amount of stored chemical energy per unit of capital cost. The operating oxidation temperature is determined at a temperature at which the largest amount of stored chemical energy per unit capital cost is achieved.

BRIEF DESCRIPTION OF THE DRAWINGS

Embodiments of the present invention are illustrated by way of example, and not limitation, in the figures of the accompanying drawings in which.

DETAILED DESCRIPTION

Figure 1:
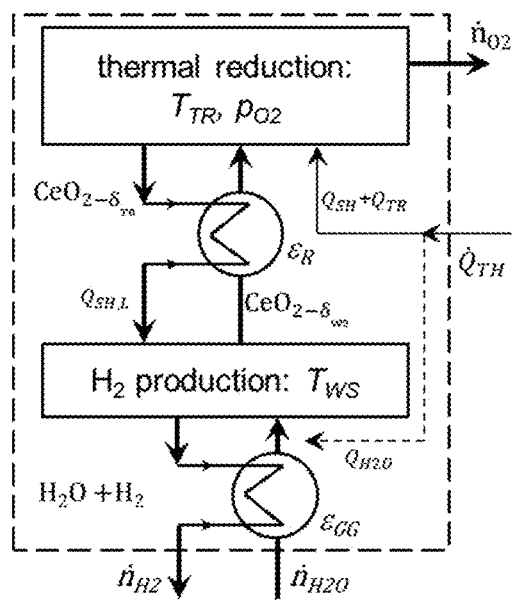
FIG. 1 is a reactor schematic according to an embodiment of the disclosure.

The present disclosure is directed to methods for conducting a two-step thermochemical cycle at maximum energy efficiency by controlling solar thermochemical reactions and designing and operating a reactor that drives the two reactions through an appropriate combination of pressure and temperature swings. The term "temperature swings," as used herein, refers to the situation wherein the two different reactions (oxidation and reduction) are carried out at different temperatures so that the thermodynamic equilibrium state of each of is more favorable. The difference in temperature between the high temperature (oxide reduction) and low temperature (reoxidation) step is the temperature swing. In the following description, numerous details are set forth. It will be apparent, however, to one skilled in the art, that the present invention may be practiced without these specific details. In some instances, well-known methods and devices are shown in block diagram form, rather than in detail, to avoid obscuring the present invention. Reference throughout this specification to "an embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not mutually exclusive.

The terms "coupled" and "connected," along with their derivatives, may be used herein to describe structural relationships between components. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g., as in a cause and effect relationship).

The reactive particles applicable to the systems and techniques described herein may generally be of any type known for thermochemical reactions that are further suitable for conveyance by the systems and techniques described herein. In an embodiment, the reactive particles may be metal oxides, for example, but not limited to binary, ternary, and quaternary metal oxides, doped or undoped spinels, perovskites, brownmillerites, or other particles including a material having a composition capable of cyclic redox reactions. In this disclosure, exemplary embodiments utilizing a metal oxide ($MO_x$), such as ceria ($CeO_2$), ferrites, manganites, cobaltites, perovskites and the like are disclosed, however, alternative embodiments may employ any known particle composition capable of similar cyclic redox reactions. Reactive particles applicable to the systems and techniques described herein may also vary in size significantly with smaller sizes having higher surface/volume ratios improving reaction rates, but potentially being more susceptible to sintering and/or melting. For one exemplary ceria particle embodiment, particle size is between about 5 μm (microns) and 500 μm (microns).

Although the reactive particles are not consumed significantly with each reaction cycle in the exemplary embodiments described herein, one of skill in the art will note the systems and techniques described herein enable particle continuous addition and extraction and are therefore readily adaptable to embodiments where the reactive particles may be consumed (e.g., attritted or volatilized) and replenished. Reactive particles applicable to the systems and techniques described herein may be a solid media of homogenous or heterogeneous composition (e.g., carrier media coated with reactive media) and of various porosity.

The two step process may be applied to various two-step thermochemical cycle processes, such as, but not limited to solar fuel production, energy storage, and air separations. In an embodiment, the two-step thermochemical cycle is for solar fuel production, and may be a water splitting process or a carbon dioxide splitting process. In water splitting, the reduced metal oxide is reoxidized with steam at a specific temperature to yield $H_2$. Some steam may be unreacted. The newly oxidized material is separated from the steam/$H_2$ gaseous environment and is then thermally reduced by raising the temperature, lowering the oxygen partial pressure, or as described herein a combination of both. The evolved oxygen is pumped or swept away and the material is then ready for reoxidation with steam after the temperature is lowered as prescribed. If material flow through the cycle is continuous, the heat released during cooling may be recuperated to help drive thermal reduction. The net result of the process is that a combination of heat and oxygen pressure manipulation split water into separate streams containing $H_2$ and $O_2$. In carbon dioxide splitting, the process is entirely analogous with $CO_2$ filling the role of $H_2O$, and CO and O2 being the products.

The disclosed methods determine the operating conditions and control parameters for operating a two-step thermochemical cycle at a point wherein the largest fraction of solar energy is converted to chemical energy.

The methods determine the preferred combination of temperature swing and pressure swing between the reduction and oxidation steps for a cyclic two-step thermochemical process for a given set of the reduction temperature, and the effectiveness of recuperation of heat from the gaseous and solid streams. The preferred combination is that which provides the greatest chemical energy output per unit solar energy input. The thermal reduction temperature will typically be at or near an upper limit determined by materials or system limitations while the recuperation will be variable based on design and cost considerations for example; foregoing recuperation is one possible configuration. The methods are applicable to any solid phase metal-oxide system and any reactor embodiment that includes the option of both temperature and pressure swing.

The methods for given reactive material include the following steps:

1. Determine the thermal reduction temperature based on materials limitations or other constraints, e.g. optimizing thermal receiver performance.
2. Determine the operating pressure (oxygen partial pressure) in the thermal reduction step.
3. Determine the solid-solid and gas-gas recuperation efficiencies.
4. Calculate the optimum temperature for the oxidation step.
5. Iterate/repeat to develop efficiency map as a function of reduction temperature, temperature swing, pressure swing, and recuperation efficiencies.
6. For water splitting, the preferred oxidation temperature is that wherein the oxide heating and steam generation heat requirements are equal or approximately equal.
7. Performance/efficiency mapping can be embedded into larger system model including the solar field, receiver, etc. to determine preferred thermal reduction temperature for overall system efficiency.
8. Performance/efficiency mapping can be embedded into larger system cost models to determine preferred configuration of thermal recuperation, pump sizes, etc. that gives the largest amount of stored chemical energy per unit of capital cost.

The methods for operating the two-step thermochemical cycle process are further disclosed by referencing a two-step solar thermochemical reactive metal oxide water splitting cycle discussed below.

Reactions (1) and (2) below, generically describe a two-step thermochemical cycle for $H_2$ production via water splitting, based on a reactive metal oxide ($MO_x$). Reaction (1) is an endothermic thermal reduction of the oxide carried out at a temperature $T_{TR}$ and pressure $P_{TR}$. Reaction (2) is the mildly exothermic reoxidation of the reduced oxide with $H_2O$, at temperature $T_{WS}$, which yields $H_2$ and restores the oxide to its initial state. In carbon dioxide splitting, the process can also be used to produce CO from $CO_2$ in reaction (2). The sum of the two reactions is heat-driven $H_2O$ splitting, described by reaction (3):

$$\frac{1}{\delta_{TR} - \delta_{WS}} MO_{x-\delta_{WS}} \rightarrow \quad \text{(4) thermal reduction at } T_{TR}, P_{TR},$$
$$\frac{1}{\delta_{TR} - \delta_{WS}} MO_{x-\delta_{TR}} + \frac{1}{2}O_2$$

$$\frac{1}{\delta_{TR} - \delta_{WS}} MO_{x-\delta_{TR}} + H_2O \rightarrow \quad \text{(5) } H_2O \text{ splitting at } T_{WS},$$
$$\frac{1}{\delta_{TR} - \delta_{WS}} MO_{x-\delta_{WS}} + H_2$$

$$H2O \rightarrow H_2 + \frac{1}{2}O_2 \quad \text{(6) } H_2O \text{ themolysis}$$

Here, $\delta_{TR}$ and $\delta_{WS}$ are the extents of reduction of the oxide following the thermal reduction and water splitting steps. Their difference, $\Delta\delta = \delta_{TR} - \delta_{WS}$, is the reversible oxygen capacity, as realized in the cycle. The oxygen partial pressure for the reduction reaction is $P_{O2}$.

At any temperature the Gibbs free energies of the above reactions are related:

$$\Delta G_1° = \Delta G_3° - \Delta G_2° \quad (4),$$

meaning that reactions (1) and (2) are thermodynamically spontaneous only in distinct and non-intersecting regions, i.e. $\Delta G_1°(T_{TR})$, $\Delta G_2°(T_{WS}) < 0$ only for $\Delta T = T_{TR} - T_{WS} > 0$. If the cycle is carried out in these temperature regions, it is driven entirely by thermal energy, i.e. a primary heat source. However, cyclically heating and cooling the oxide between $T_{TR}$ and $T_{WS}$ opens the possibility for thermal losses that may render $H_2$ production inefficient in practice.

At temperatures where reactions (1) and (2) are not spontaneous, additional energy must be provided to the system (generally in some form other than heat, i.e. a secondary energy source) in order to drive the reactions towards the same endpoints. The minimum amount of thermal energy, $Q_{min}$ that must be supplied to carry out the cycle in this general case is:

$$Q_{min}(T_{TR}, T_{WS}) = \Delta H_1^\circ(T_{TR}) + \frac{(1-\varepsilon_R)}{\Delta \delta F_R} C_p \Delta T + \frac{\Delta G_1^\circ(T_{TR})}{\eta_1} + \frac{\Delta G_2^\circ(T_{WS})}{\eta_2}. \quad (5)$$

The 1$^{st}$ term on the right-hand side is simply the reduction endotherm. The 2$^{nd}$ term accounts for thermal cycling, where $C_p$ is the molar specific heat capacity of the reactive oxide, $F_R$ is the molar fraction of the solid that is reactive (as opposed to inert), and $\varepsilon_R$ is the effectiveness of solid-solid heat recovery. The 3$^{rd}$ and 4$^{th}$ terms generically (the process is not specified) account for the scenario(s) where reactions (1) and/or (2) are carried out at unfavorable temperatures, i.e. when $\Delta G_1^\circ(T_{TR})>0$ and/or $\Delta G_2^\circ(T_{WS})>0$, and represent the minimum work must be performed to drive reaction (1) and/or (2). This work is determined by $\Delta G_1^\circ$ and/or $\Delta G_2^\circ$ the respective conditions. Coefficients $\eta_1$ and $\eta_2$ account for losses in converting heat to the required amount of work. Additionally, they implicitly include the possibility that waste heat (i.e. heat of reoxidation and unrecovered oxide sensible heat) can be used to provide part of the work in the 3$^{rd}$ and 4$^{th}$ term. (See also discussion of eq. 11.) The limiting case ($Q_{min}=\Delta H_1^\circ$) applies to a system operating in the favorable temperature regimes with ideal heat recovery ($\varepsilon_R=1$).

To understand the implications of eq. 5, consider the situation where $\Delta T=0$ (ITWS), at a temperature intermediate to those of the thermodynamically favorable regimes. In this case, no energy is required for thermal cycling (the 2nd term is zero), but work must be added to both reactions (1) and (2). As $T_{TR}=T_{WS}$ change in value, the 2nd term remains zero and $\Delta G_1^\circ$ and $\Delta G_2^\circ$ increase and decrease in opposition to one another. As discussed below, the thermodynamic limits of this special case can be determined without any knowledge of the reactor design or properties of the working materials.

More interestingly, from an application perspective, if $T_{TR}$ is increased and $T_{WS}$ is decreased (TSWS), the thermal cycling energy requirement (2nd term) becomes nonzero and grows, but the work requirements embodied by $\Delta G_1^\circ$ and $\Delta G_2^\circ$ decrease and are eventually eliminated. Thus, eq. 5 suggests that for a given material (defining the thermodynamics) and set of reactor and process designs (defining the various efficiencies, practical and physical limitations, parasitic losses, etc.) there should be such $T_{TR}$ and $T_{WS}$ that minimize the sum of the last three terms in eq. 5, and therefore $Q_{min}$.

Determining the conditions under which a two-step reactor operates at maximum efficiency requires the knowledge of the thermodynamic properties of the working material, as well as a reactor model. Specific thermodynamic properties of reactive oxides are not generally known, and are typically determined by extensive experimentation. Generalizations can therefore be made, but there is no universal solution.

Figure 3:
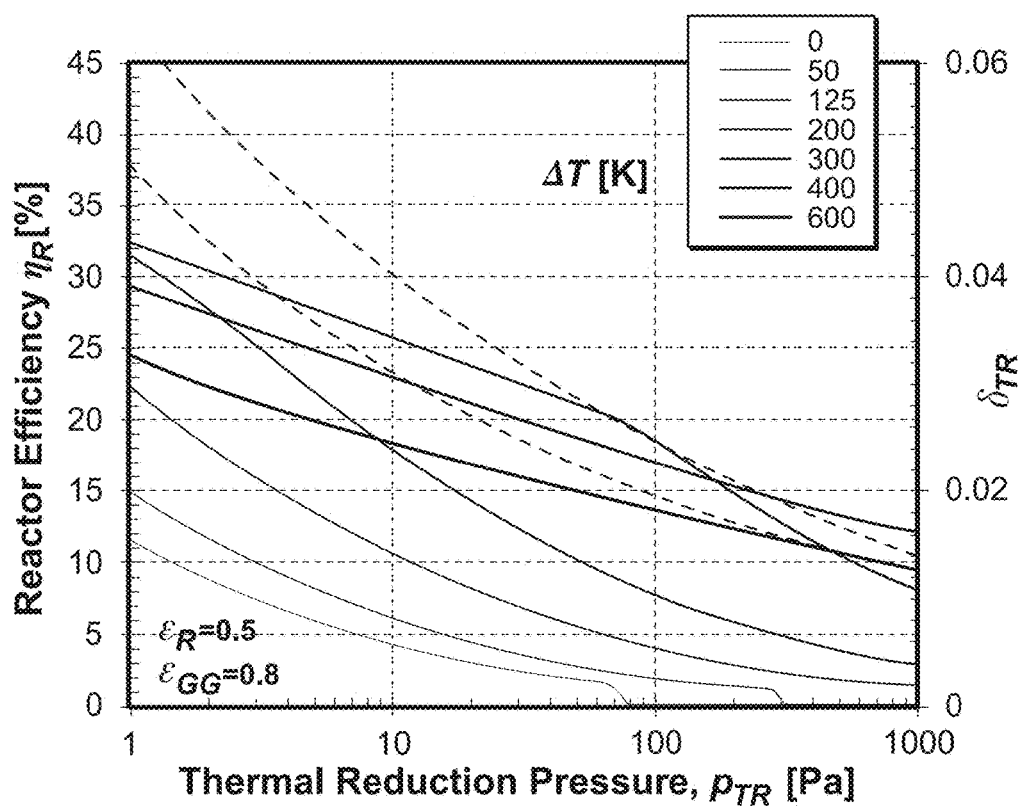
FIG. 3 shows the efficiency $n_R(p_{TR})$, for several values of $\Delta T$, $\varepsilon_R$–0.5,and $\varepsilon_{GG}$–0.8, according to an embodiment of the disclosure. In this non-isothermal example, the metal oxide is assumed to be cerium oxide (ceria)

For the purpose of demonstrating efficiency calculations, we use assume $CeO_2$ as the active oxide, a well characterized candidate material for solar thermochemical water splitting. The thermodynamics of $CeO_2$ are obtained from the work of Zinkevich et al. (M. Zinkevich, D. Djurovic, F. Aldinger "Thermodynamic Modelling of the Cerium-Oxygen System" Solid State Ionics, 2006;177, 989.). These authors performed a comprehensive, critical review of the thermodynamic literature concerning cerium oxides and applied a Calphad analysis to derive models covering all relevant phases (including both liquids and solids). This comprehensive approach covers the entire temperature range relevant to our analysis, and is necessary to accurately describe non-stoichiometric phases, such as the ceria fluorite phase ($CeO_{2-\delta}$) of concern here, which persists from $\delta=0$ to $\delta \approx 0.3$ at 1773 K. This model also generally predicts lower values of $\delta(p,T)$ than models based solely on the experiments by Panlener (R. J. Panlener, R. N. Blumenthal, J. E. Garnier "A Thermodynamic Study of Nonstoichiometric Cerium Dioxide" Journal of Physics and Chemistry of Solids 1975, 36, 1213.), used in almost all previous studies. This difference leads to lower overall efficiency predictions for the comprehensive approach, but the conclusions of the analysis remain unchanged by the choice of model. The difference between ceria reduction models is illustrated in FIG. 3.

FIG. 1 is a schematic of a reactor according to an embodiment of the disclosure. As can be seen in FIG. 1, heat exchangers and their effectiveness ($\varepsilon_R$ and $\varepsilon_{GG}$) are indicated in the oxide and steam flows. The input solar heat power $\dot{Q}_{TH}$ is used to add sensible heat to the ceria ($Q_{SH}$) and to partially reduce it ($Q_{TR}$). If the heat from the $H_2$ production reaction ($Q_{MOX}$) and the unrecovered sensible heat of the oxide ($Q_{SH,L}$), is insufficient to heat steam to $T_{WS}$ ($Q_{H2O}$), part of $\dot{Q}_{TH}$ is used. For simplicity and because it is of minor importance, heat recovery from the $O_2$ stream is not shown, but it is included in the calculations (cf. eq. 11).

The reactor is assumed to accomplish four primary unit operations, common to many thermochemical reactor designs. These are a thermal reduction, solid-solid heat exchange in a thermal recuperator, $H_2$ production (water splitting), and steam pre-heating. During operation, concentrated solar radiation heats and thermally reduces the reactive oxide in a thermal reduction chamber. The oxide then moves through the recuperator (entering at the hot inlet) and then into an $H_2$ production chamber, where it is exposed to a pre-heated steam flow in a countercurrent arrangement, producing $H_2$. The reoxidized material is then brought back to the reduction chamber, via the recuperator, where heat is exchanged between the two oxide flows.

The reactor heat-to-$H_2$ efficiency or reactor efficiency, $\varepsilon_R$, is defined as:

$$\eta_R = \frac{\dot{n}_{H_2} HHV_{H_2}}{\dot{Q}_A}, \quad (6)$$

where $\dot{n}_{H2}$ is the hydrogen molar production rate, $HHV_{H2}$ is its higher heating value, and $\dot{Q}_A$ is the solar power at the reactor aperture. Efficiency calculations incorporate an important assumption: Only solar primary energy is used for the entire operation of the reactor. This includes all heat needs, such as thermal reduction, ceria and feedstock heating, and heat equivalents of mechanical work, such as vacuum pumping, compression, oxide moving, etc. Equally importantly, all major losses and inefficiencies are also included, (e.g. black body radiation through the aperture at a concentration ratio $C_A=3000$, conversion efficiency from heat to mechanical work, etc.) Radiation losses are included in the reactor efficiency for completeness and for ease of comparison with other work. The sensible heat of the product gasses is used to preheat steam (with a gas-gas heat recovery effectiveness $\varepsilon_{GG}$), and to generate power. Conduction losses through insulated reactor walls are considered negligible in a large device. The sensible heat in the $O_2$ product is comparatively small, and its omission or inclusion has little effect on the efficiency calculations.

The $H_2$ molar production rate in eq. 6 can be expressed in terms of the heat input power ($\dot{Q}_{TH}$) and the heat required for production of 1 mol $H_2$ ($Q_{mol}$):

$$\dot{n}_{H_2} = \frac{\dot{Q}_{TH}}{Q_{mol}}. \tag{7}$$

After losses to aperture intercept (A=0.95) and thermal re-radiation ($P_{rad}$), $\dot{Q}_{TH}$ can be expressed as:

$$\dot{Q}_{TH} = A^* \dot{Q}_A - P_{rad} \tag{8},$$

whereas $Q_{mol}$ is:

$$Q_{mol} = Q_{TR} + Q_{SH} + Q_{AUX} \tag{9}.$$

Here the individual terms (roughly ordered by decreasing temperature) correspond to those in eq. 5 as follows: $Q_{TR} = \Delta H_r(CeO_2)$ is the thermal reduction endotherm. The energy required for heating the oxide (sensible heat) from $T_{WS}$ to $T_{TR}$ (assuming $F_R=1$) is:

$$Q_{SH} = \frac{C_p}{\Delta\delta}\Delta T(1-\varepsilon_R), \tag{10}$$

where the molar heat capacity of $CeO_2$ is $C_p \approx 80$ J/mol K.[22] Finally, $Q_{AUX}$ encompasses the heat equivalents of other, auxiliary, energy requirements:

$$Q_{AUX} = (Q_{H_2O} + Q_{pump} + Q_{mech}Q_{sep}) - (Q_{MOX} + Q_{SH,L} + Q_{O_2}) \tag{11}$$

Here $Q_{H2O}$ is the energy required to heat steam by $\Delta T_{I/O} = T_{WS} - T_O$, i.e. from ambient temperature ($T_O$) to $T_{WS}$, and it includes preheating by hot product streams. The heat equivalents of the pumping of products (in both chambers) and mechanical and separation work are $Q_{pump}$, $Q_{mech}$, and $Q_{sep}$, respectively The negative terms represent the waste heat available from the product gasses, mainly the $H_2O$-$H_2$ mix, which consists of the heat released at $T_{WS}$ in the reoxidation reaction, $Q_{MOX} = \Delta H_r - \Delta H_c^°{}_{H2}$, and the unrecovered sensible heat of the oxide, $Q_{SH,L}$. Steam, in the fuel production chamber, acts as both a reactant (oxidizer) and a coolant. The sensible heat in the oxygen exhaust is $Q_{O2}$.

Importantly, $Q_{AUX}$ is forced to be non-negative, i.e. it is set to zero when the waste heat exceeds the first three terms in eq. 11, since heat at $T_{WS}$ cannot contribute to either $Q_{TR}$ or $Q_{SH}$. The quantities in eq. 11 are heat equivalents, so conversion efficiency terms are included where applicable, such as the conversion of heat to mechanical or pump work. An efficiency of 10% was used for heat-to-pump work and for the oxide moving work. Thermal reduction and water splitting are assumed to end in their thermodynamic equilibrium states, i.e. kinetic limitations are not considered.

The appeal of ITWS lies in the perceived simplification of reactor design and operation, as it eliminates the need for solid-solid heat recovery and, depending on the design, the frequent temperature cycling of reactor components. Coincidentally, this special case lends itself to straightforward theoretical analysis. To begin, we use well-known relationships for each of the reactions (1), (2), and (3):

$$\Delta G^° = -RT \ln K \text{ and } \Delta G^° = \Delta H^° - T\Delta S^° \tag{12) and (13},$$

where R is the gas constant. The equilibrium constants for reactions (1) and (2) depend on the reactant and product activities:

$$K_1 = \frac{(a_{O_2})^{1/2}(a_{MO_{x-\delta_{TR}}})^{1/\Delta\delta}}{(a_{MO_{x-\delta_{WS}}})^{1/\Delta\delta}} \text{ and} \tag{14) and (15}$$

$$K_2 = \frac{(a_{H_2})(a_{MO_{x-\delta_{WS}}})^{1/\Delta\delta}}{(a_{H_2O})(a_{MO_{x-\delta_{TR}}})^{1/\Delta\delta}}.$$

At all relevant operating pressures, the gas activities can be expressed as partial pressures:

$$a_{O_2} = p_{O_2} \text{ and } \frac{a_{H_2}}{a_{H_2O}} = \frac{p_{H_2}}{p_{H_2O}}, \tag{16) and (17}$$

where $p_{O_2}$ is measured relative to standard pressure. Substituting eqs. 12, 13, 16 and 17 into eq. 4 gives:

$$-RT_{iso}\ln(p_{O_2}^{1/2}) - RT_{iso}\ln\left(\frac{a_{MO_{x-\delta_{TR}}}^{1/\Delta\delta}}{a_{MO_{x-\delta_{WS}}}^{1/\Delta\delta}}\right) = \tag{18}$$

$$\Delta H_3^° - T_{iso}\Delta S_3^° + RT_{iso}\ln\left(\frac{p_{H_2}}{p_{H_2O}}\right) + RT_{iso}\ln\left(\frac{a_{MO_{x-\delta_{WS}}}^{1/\Delta\delta}}{a_{MO_{x-\delta_{TR}}}^{1/\Delta\delta}}\right).$$

Here $T_{iso}$, is the isothermal operating temperature. Solving for $T_{iso}$ is facilitated by the exact cancellation of the oxide terms on the left and right side of eq. 18, giving:

$$T_{iso} = \frac{-\Delta H_3^°}{R\left(\ln(p_{O_2}^{1/2}) - \ln\left(\frac{p_{H_2O}}{p_{H_2}}\right)\right) - \Delta S_2^°}. \tag{19}$$

FIG. 1a shows the relationship between $T_{iso}(n_{w/h})$ and $p_{O2}$. For the water splitting reaction constant thermodynamic values of $$\Delta H_3^° = 250.8 \frac{kJ}{mol} \text{ and } \Delta S_3^° = 57.35 \frac{J}{mol-K}$$

are assumed. These are the values at 1673 K and best represent the temperature range of practical interest. Adopting values for a different temperature introduces very small differences in the results. The fading rectangle in FIG. 2a roughly indicates a reasonable operating parameter space for a practical reactor and shows that ITWS largely falls outside of it.

Figure 2A:
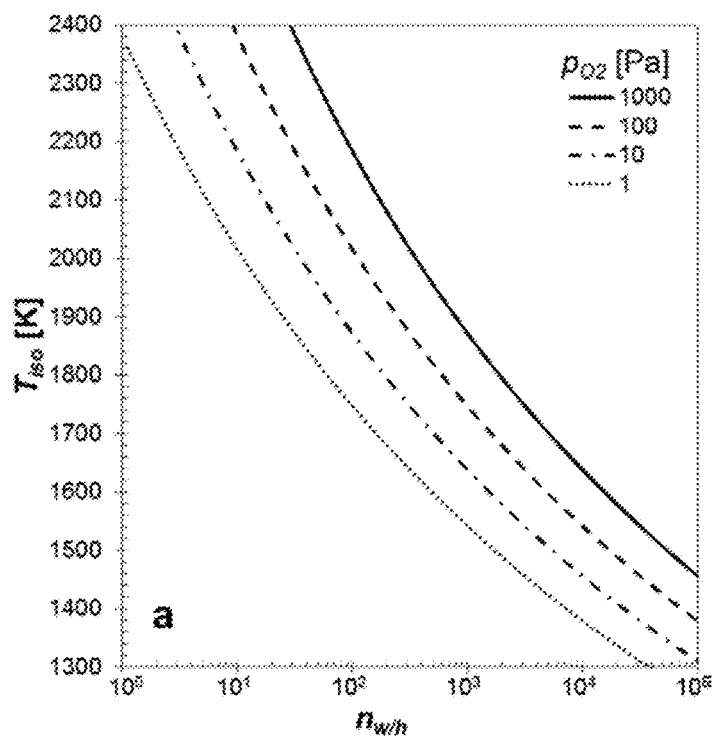
FIG. 2a shows the relationship between $T_{iso}(n_{w/h})$ and $p_{O2}$.
Figure 2B:
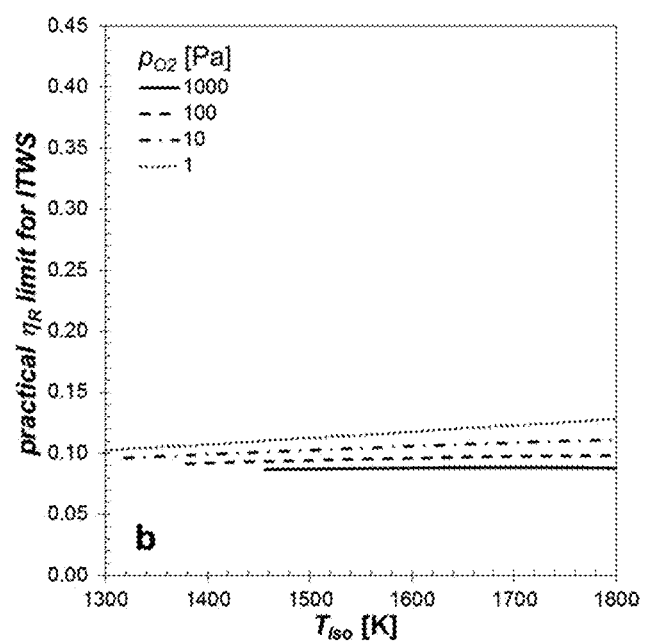
FIG. 2b shows the practical efficiency limits for isothermal two-step water-splitting cycles.

FIG. 2*b* shows practical efficiency limits for ITWS. Efficiency curves are plotted for $n_{w/h}<10^5$. The lack of results below certain $T_{iso}$ for the higher $p_{O2}$ values indicates that ITWS is not possible for $n_{w/h}<10^5$. The efficiency scale in FIG. 2*b* was chosen for ease of comparison with FIGS. 3, 4 and 5.

Referring again to FIG. 2*a*, the relationship between $T_{iso}$ and $n_{w/h}$, for several values of $P_{O2}$ ($n_{w/h}=n_{H2O}/n_{H2}$ resulting from the oxidation step (ideal gas behavior is assumed so $p_{H2O}/p_{H2}$ and $n_{H2O}/n_{H2}$ are used interchangeably) is shown. It is evident from FIG. 2*a* that relaxing one parameter results in the restriction of one or both of the other two. For example, decreasing $T_{iso}$ requires either a $p_{O2}$ decrease or an $n_{w/h}$ increase, or both. Importantly, FIG. 2*a* strictly applies to an ideal isothermal cycle. A real isothermal cycle would require even more stringent operating conditions than an ideal one (e.g. a higher $T_{iso}$ at the same values of $p_{O2}$ and $n_{w/h}$), for example due to kinetic limitations.

It is important to understand that the results in FIG. 2*a* are general in the sense that a cycle represented by a valid combination of the three parameters can be performed by multiple possible materials which must satisfy eq. 4 at $T_{iso}$. Conversely, this requirement means that an isothermal cycle, defined by a point in the graph, cannot be realized by arbitrarily chosen materials. The high temperatures (in this case $T_{TR}=T_{WS}=T_{iso}$), low $p_{O2}$, and high $n_{w/h}$ values indicated in FIG. 2*a*, raise questions regarding the ultimate feasibility of ITWS. To understand the implications of these results and to outline a realistic space of operating parameters, we consider the practical limitations regarding $T_{TR}$, $p_{O2}$, and $n_{w/h}$.

Increasing $T_{iso}$ corresponds to less strict $p_{O2}$ (higher) and $n_{w/h}$ (lower) requirements, and isothermal temperatures as high as 2173 K have been considered. However, radiation losses through the reactor aperture, as well as oxide sublimation and reactivity with reactor structures, limit $T_{TR}$ to no more (and possibly substantially less) than 1773 K in devices of practical relevance. To appreciate the challenge of ITWS under the extreme conditions considered in the literature, it is instructive to note that at 2173 K, ceria has a vapor pressure $p_{CeO2} \approx 9.3$ Pa, leading to a swift and irreversible oxide loss via sublimation, as observed experimentally by Abanades et al.

It is assumed that low $p_{O2}$ is achieved by pumping, i.e. lowering of $p_{TR}$, the total pressure in this step (therefore $p_{O2}=p_{TR}$). As shown in a previous analysis, the heat equivalent of pump work is not a major contributor to the total energy requirement, but the lowest $p_{TR}$ is limited by other factors, such as oxygen volumetric flow and entering the molecular flow regime, to no less than 1 Pa.

The alternative, isothermal inert gas sweeping, was examined by Bader et al., who showed that, even under best-case conditions, the amount of required $N_2$ by far exceeds the amount of the $H_2$ product ($n_{N2}/n_{H2} \approx 700$). In addition to requiring an $N_2$ purification plant, the only manner of somewhat efficient ITWS was found to require exceptionally high levels of heat recovery (>95%) between the incoming and outgoing $N_2$ gas–at $T_{iso}$. Finally, the vast majority of the products are the inert-oxygen mix and steam, not $H_2$. It can thus be concluded that sweeping is not an option for ITWS.

The above practical limitations regarding $T_{TR}$ and $p_{TR}$ give context to the results in FIG. 2*a*: For example, even for very low $p_{TR}$ (e.g. 1 Pa), and the highest operationally relevant $T_{iso}$ of 1773 K, large amounts of steam must be provided for a very low $H_2$ yield ($n_{h/w}=n_{H2}/n_{H2O}<<1$); i.e. the majority of the reactor "product" would then be unreacted steam, not $H_2$. In short, ITWS requires impractically high thermal reduction temperatures, or exceptionally low thermal reduction pressures, or results in an exceptionally low $H_2$ fraction in the output stream. As the derivation of eq. 19 shows, these results and associated limitations are a consequence of water thermodynamics and the basic relationship for the Gibbs free energy of the reduction and oxidation reactions (eq. 4), and can therefore not be circumvented by either redox material choice or innovative reactor design.

For a deeper insight into the implications of the tradeoffs associated with ITWS, the low $H_2$ fraction or high $n_{w/h}$ values can be viewed in the context of separation work, i.e. the work that must be performed to separate $H_2$ from the $H_2$-poor output stream. Separation work is directly related to efficiency, and practical ITWS efficiency limits, as defined in eq. 6, can be estimated by including some well-established efficiencies of the constituent processes. Re-radiation losses are given in eq. 8($\sim T_{iso}^4$). Separation work ($2^{nd}$ law) depends on $T_{iso}$, $n_{h/w}$, and the final $H_2$ purity, assumed here to be a modest $x_{H2}=99.9\%$. The practical separation efficiency (i.e. theoretical $2^{nd}$ law work vs. actual work) is generally ~15%, albeit not at the high temperatures considered here. The heat-to-power efficiency of a Rankine cycle in concentrated solar power plants, necessary to perform pump and separation work, is at best $\approx 40\%$. Finally, neglecting other work and heat requirements, and keeping the assumption for the heat-to-pumping efficiency (10%) from Section 2.2, plotted in FIG. 2*b* shows the practical limits for ITWS efficiency ($h_R$).

The results show that the ITWS $\eta_R$ values are low, even at high $T_{iso}$ and low $p_{O2}$. The limits are almost independent of $T_{iso}$ and depend very weakly on $p_{O2}$. In light of the outstanding operating conditions shown in FIG. 2*a*, low efficiencies should not be surprising. The relative insensitivity of the results on $T_{iso}$ and $p_{O2}$ may, on the other hand, be initially unexpected. This, however, is a manifestation of the mutual dependence of the operating conditions ($p_{O2}$, $n_{w/h}$, and $T_{iso}$), which are dictated solely by water thermodynamics as expressed in eq. 19. Simply put, the results in FIG. 2*b* show that, whether one in practice accepts higher re-radiation losses (to increase $T_{iso}$), or chooses to invest work in pumping (to lower $p_{O2}$) or in $H_2$ separation (to allow higher $n_{w/h}$), the overall ITWS efficiency limit is roughly the same, in what can be viewed as a thermodynamic zero-sum game.

The above results describe the conditions required for ITWS and indicate the practical difficulties in realizing it, including inherent limitations on efficiency. In this section, the effects of operational parameters on efficiency in the general case where $\Delta T \geq 0$ are examiner. In this case, both material and reactor assumptions, as discussed above are included. $p_{TR}$ is limited to values between 1 Pa and 1 kPa—low enough to meaningfully facilitate thermal reduction, but not too low to be entirely unfeasible in a reactor in the field. Likewise, $T_{TR}=1773$ K is set.

The above results describe the conditions required for ITWS and indicate the practical difficulties in realizing it, including inherent limitations on efficiency. In the following paragraphs, the effects of operational parameters on efficiency in the general case where $\Delta T \geq 0$ are examined. In this case, both material and reactor assumptions as detailed above are included. $p_{TR}$ is limited to values between 1 Pa and 1 kPa—low enough to meaningfully facilitate thermal reduction, but not too low to be entirely unfeasible in a reactor in the field. Likewise, we set $T_{TR}=1773$ K.

FIG. 3 shows the efficiency $\eta_R(p_{TR})$, for several values of $\Delta T, \varepsilon_R=0.5$, and $\varepsilon_{GG}=0.8$. In FIG. 3, solid lines show the calculated reactor efficiency as function of $p_{HR}$, for several values of $\Delta T$ (left y-axis). Note the nil efficiency for ITWS above $p_{TR} \approx 75$ Pa, and the initial efficiency increase, followed by a decrease, as $\Delta T$ increases from 0 K to 400 K. Dashed lines, on the right y-axis, show the extent of thermal reduction, $\delta_{TR}$ (assuming $T_{TR}=1773$ K). The black dashed line is for the comprehensive model used in this work (based on Zinkevich et al.), whereas the white line is based on Panlener only.

As can be seen in FIG. 3, two important features are immediately evident in the plot. Firstly, ITWS ($\Delta T=0$) yields the lowest efficiency for every $p_{TR}$ in the range. Secondly, for $p_{TR} \approx 75$ Pa and above, ITWS efficiency is zero, whereas TSWS ($\Delta T>0$) for the same $p_{TR}$ yields a positive efficiency.

The latter is a special case of a more general result, also evident in FIG. 3: for low values of $\Delta T$, the efficiency is zero above some critical $p_{TR}$. This stems from the presence of oxygen in steam as a result of partial dissociation, characterized by a well-known pressure, $p_{O2,d}$ (e.g. $P_{O2,d}(1773 \text{ K}) \approx 75$ Pa) For some values of $p_{TR}$ and $T_{WS}$, the equilibrium oxygen pressure above the oxide, $$p_{O_2, CeO_{2-\delta_{TR}}}$$

($T_{WS}$), exceeds $p_{O2,d}(T_{WS})$, leading to further oxide reduction (not reoxidation) in steam, and yielding no $H_2$ product.

Figure 4:
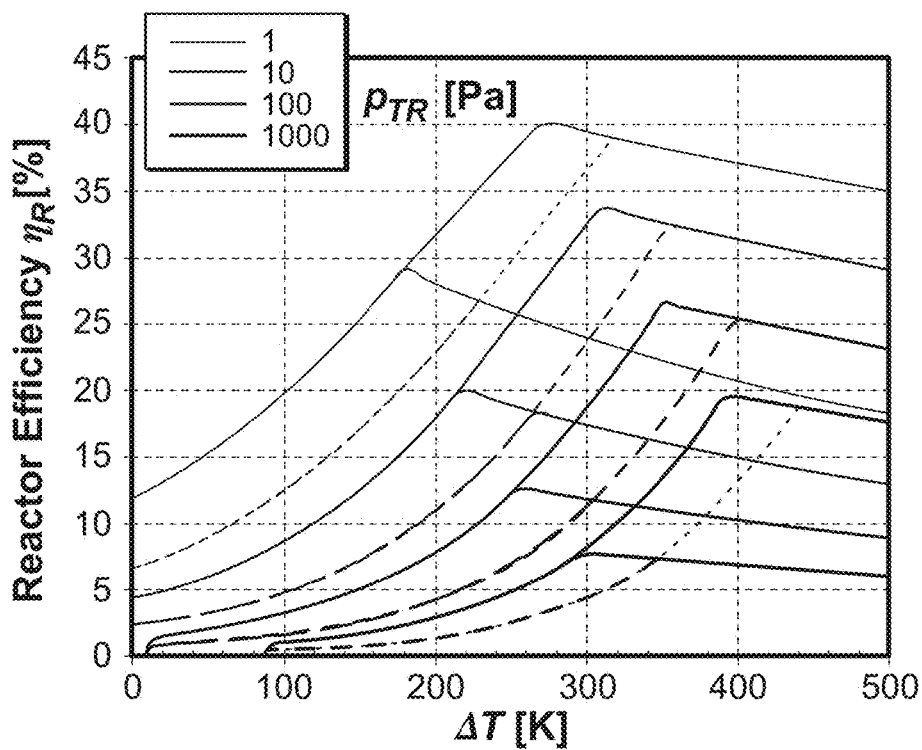
FIG. 4 shows calculated reactor efficiencies as a function of $\Delta T$. Solid lines are for $\varepsilon_{GG}$=0.8, whereas dashed lines are for $\varepsilon_{GG}$=0.6. Thick lines are for $\varepsilon_R$–0 and thin ones for $\varepsilon_R$=0.75. Lines of the same color correspond to the same $P_{TR}$. The metal oxide in this example is ceria.

$\Delta T_{opt}$, defined as the value of $\Delta T(p_{TR}, \varepsilon_R \varepsilon_{GG})$ for which $Q_{min}$ (eq. 5) is the smallest, and efficiency ($\eta_R$) is the highest, can now be determined. To visually introduce the $\Delta T_{opt}$ concept, the efficiency curves in FIG. 3, from yellow to black, at a constant $P_{TR}$ can be followed. A trend is evident: $\eta_R(\Delta T)$ initially increases and then decreases with $\Delta T$. Focusing on this trend, FIG. 4 shows the efficiency as function of $\Delta T$, $\eta_R(\Delta T)$, for $\varepsilon_R=0$ and $\varepsilon_R=0.75$, with two values of $\varepsilon_{GG}$ (0.8 and 0.6) and several values of $p_{TR}$. The chosen values for $\varepsilon_R$ and $\varepsilon_{GG}$ reflect the awareness that heat recovery at high temperature is challenging, and a high effectiveness, however desirable, may not be possible in practice.

A peak efficiency, $\eta_R(\Delta T_{opt})$, exists for any of the combinations of $p_{TR}$, $\varepsilon_R$, and $\varepsilon_{GG}$ in FIG. 4. For the chosen range of parameters, $\Delta T_{opt}$ varies roughly between 180 K and 440 K. Furthermore, for most regimes, ITWS efficiency is several-fold lower than that at $\Delta T_{opt}$, and it also yields the lowest efficiency for all $\varepsilon_R$ and $\varepsilon_{GG}$. This is especially pronounced for $\varepsilon_{GG}=0.6$. Other trends are also apparent. For example, $p_{TR}$ decrease and $\varepsilon_R$ decrease generally lead to a $\Delta T_{opt}$ decrease, whereas $\varepsilon_{GG}$ decrease leads to a $\Delta T_{opt}$ increase. Efficiency generally increases with decreasing $p_{TR}$, and increasing $\varepsilon_R$ and $\varepsilon_{GG}$. Conversely, the lowest efficiencies would be realized at high (e.g. atmospheric) $p_{TR}$, in the absence of heat recovery.

Some of the efficiency curves in FIG. 4 coincide. First, below $\Delta T_{opt}(\varepsilon_R=0)$, $\eta_R(\varepsilon_R=0)=\eta_R(\varepsilon_R=0.75)$. Second, above $\Delta T_{opt}(\varepsilon_{GG}=0.6)$, $\eta_R(\varepsilon_{GG}=0.6)=\eta_R(\varepsilon_{GG}=0.8)$. Finally, curves for $p_{TR}$ and $\varepsilon_R=0$ coincide with curves for $10^*p_{TR}$ and $\varepsilon_R=0.75$, below $\Delta T_{opt}(p_{TR}, \varepsilon_R=0)$. The first two coincidences result from the balance of energy requirements in the cycle, including those that lead to low isothermal efficiency, and can be understood by considering the interplay of factors that determine $\Delta T_{opt}$. First, we recall that the unrecovered sensible heat of the reduced oxide and the heat of the reoxidation reaction are used to preheat the steam feedstock to near $T_{WS}$, via the hot $H_2O-H_2$ exhaust (FIG. 1). Furthermore, oxide reduction ($Q_{TR}$), oxide heating ($Q_{SH}$), and steam heating ($Q_{H2O}$) are by far the three largest energy requirements in the system (depending on $\Delta T$). Of these, $Q_{SH}$ and $Q_{H2O}$ can be considered parasitic, since they do not directly contribute to $H_2$ production (whereas $Q_{TR}$ does, with an efficiency given by $HHV_{H2}/Q_{TR}$). Therefore, at the point where $Q_{SH}$ and $Q_{H2O}$ are roughly balanced, the least amount of direct solar input is required for steam heating or the least amount of the oxide sensible heat has to be rejected, thus leading to peak efficiency.

The coinciding efficiencies in FIG. 4 can now be explained as follows: First, below $\Delta T_{opt}$, $Q_{H2O}$ is the largest energy requirement and it requires direct solar input (in addition to preheating). Specifically, the region of coincidence, where $\eta_R(\varepsilon_R=0)=\eta_R(\varepsilon_R=0.75)$, corresponds to a situation in which direct solar input is required for steam heating irrespective of $\varepsilon_R$. More generally, below $\Delta T_{opt}(\varepsilon_R=0)$, $Q_{H2O}$ is sufficiently large to make efficiency independent on $\varepsilon_R$. The situation corresponds to a low and eventually zero $2^{nd}$ right-hand term in eq. 5 (at $\Delta T=0$), and a large $4^{th}$ term.

In light of this, the reasons behind the very low efficiency for ITWS are straightforward: While no energy is needed to heat the oxide after the water splitting reaction ($Q_{SH}=0$ in FIG. 1), $Q_{H2O}$ is at its maximum, even with extensive preheating by the $H_2O-H_2$ output. This is because, at $\Delta T=0$, both $n_{w/h}$ and $\Delta T_{I/O}$ are at their maximum values. Since $Q_{SH,L}=0$, virtually all of $Q_{H2O}$ requires direct solar input. This dominant role of $Q_{H2O}$ in ITWS (but not for $\Delta T > \Delta T_{opt}$) also strongly cautions against omitting this energy requirement from efficiency calculations, as is sometimes done.

Second, for $\Delta T > \Delta T_{opt}$, oxide heating is the largest energy requirement and it requires direct solar input (to the extent that $\varepsilon_R<1$). In this region, $Q_{H2O}$ is small, mainly because, at low $T_{WS}$, comparatively little steam is needed to oxidize ceria back to equilibrium ($n_{w/h}$ is small), but also because $\Delta T_{I/O}$ is smaller, compared to ITWS. Therefore, $Q_{SH}/Q_{H2O}>1$. In fact, at $\Delta T > \Delta T_{opt}$, $Q_{AUX}<0$, necessitating heat rejection. Alternatively, this high quality waste heat can be used for other purposes, even though it cannot directly increase reactor efficiency. This corresponds to a small $4^{th}$ right-hand term in eq. 5 (compared to the $2^{nd}$ term).

Lastly, coinciding efficiency curves for $\varepsilon_R=0$ and $\varepsilon_R=0.75$ reflect the particulars of ceria thermodynamics. As it happens, below $\Delta T_{opt}(P_{TR})$, decreasing $P_{TR}$ by a factor of 10 is equivalent, in efficiency terms, to increasing $\varepsilon_R$ from 0 to 0.75.

The high $\varepsilon_{GG}$ required for efficient ITWS and low $\Delta T$ operation warrants some further consideration. High levels of gas-gas heat recovery (>97%) are attainable at temperatures up to roughly 923 K using stainless steel recuperators. At higher temperatures, creep and corrosion limitations require the use of nickel alloys (up to $\approx$1273 K), and no recuperators operating at 1773 K or higher have been reported. Since in ITWS $Q_{H2O}$ is the highest, the role of gas-gas heat exchange is critical. For ITWS at $p_{TR}=1$ Pa, $T_{iso}=1773$ K and $\Delta T_{I/O}=1475$ K, nearly 100 mol of steam must be heated per mole of produced $H_2$ (FIG. 2a). The associated energy requirement considerably exceeds the chemical energy content of the $H_2$ product, even for high $\varepsilon_{GG}$.

The above further underscores the challenges associated with ITWS: If an exceptionally high $\varepsilon_{GG}$ cannot be achieved in practice, the efficiencies for ITWS would be even lower than those shown in FIG. 4. On the other hand, as $\Delta T$ increases (i.e. $T_{WS}$ decreases), higher $\varepsilon_{GG}$ values become more realistic. To account for this, we calculate efficiency in a more flexible fashion, by using a variable $\varepsilon_{GG}$, such that it is realistic at both high and low $T_{WS}$ (FIG. 5).

Figure 5:
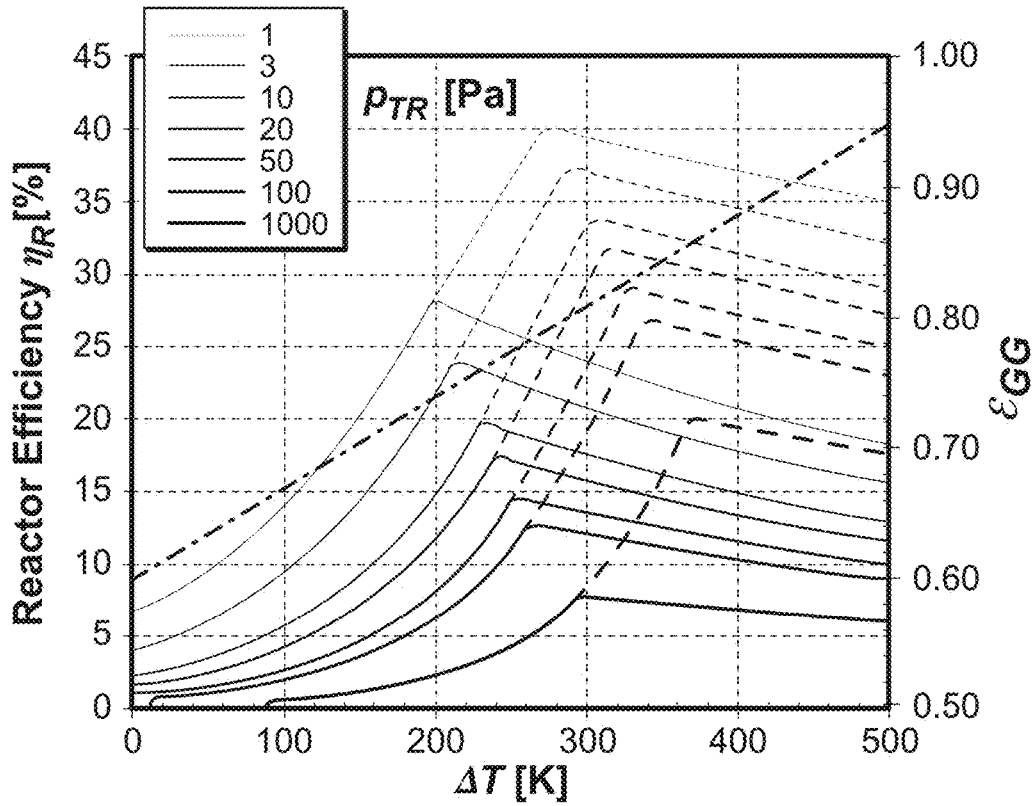
FIG. 5 shows calculated reactor efficiencies (left y-axis) as a function of $\Delta T$, for $\varepsilon_{GG}$ linearly increasing from $\varepsilon_{GG}$ (1773 K)=0.6 to $\varepsilon_{GG}$(1273 K)=0.95 The metal oxide in this example is ceria.

FIG. 5 shows calculated reactor efficiencies (left y-axis) as a function of $\Delta T$, for $\varepsilon_{GG}$ linearly increasing from $\varepsilon_{GG}$ (1773 K)=0.6 to $\varepsilon_{GG}$ (1273 K)=0.95. This roughly corresponds to a situation where heat from the output steam-$H_2$ mixture is rejected above 1273 K. Solid lines are for $\varepsilon_R=0$, dashed lines are for $\varepsilon_R=0.75$. The dash-dot line shows $\varepsilon_{GG}$ on the right y-axis.

The results in FIG. 5 give insight into what might be expected in practice, and show an even larger efficiency advantage of TSWS over ITWS. Although this analysis is for a pumped reactor, it is worth repeating at this point that efficiently recovering heat from a sweep gas would face the same obstacles as in the case of steam, with the added construction difficulty that it must be performed at $T_{TR}$, irrespective of $\Delta T$. However, operating at $\Delta T_{opt}$ and under best-case conditions, would significantly decrease sweep gas requirements compared to ITWS, thus much decreasing, possibly even eliminating the need for heat recovery from the inert-oxygen exhaust and associated hardware complications. An inert gas purification plant would still be necessary.

Solid-solid heat recovery being also challenging, we have consistently included the limiting case of $\varepsilon_R=0$. Understanding that $\varepsilon_R=0.75$ is near the upper end of what may be possible in practice, plots such as that in FIG. 5 can be helpful for roughly estimating maximum reactor efficiency: for every $p_{TR}$, it lies approximately between the peaks of the corresponding solid and dashed lines. The results in FIGS. 4 and 5 in show that for ceria and moderate values of the operating parameters, such as $P_{TR}>10$ Pa, $\varepsilon_R<0.5$, and $\varepsilon_{GG}<0.7$, efficiency ranges roughly from 10 to 25%, whereas the $\Delta T_{opt}$ range is roughly between 250 K and 400 K.

It should be noted at this point that the assumption that all reactions end in their thermodynamic equilibrium states is more important in ITWS, when $\Delta\delta$ is small and the system operates near equilibrium, than for $\Delta T>0$, when $\Delta\delta$ is comparatively large. Therefore, any deviations from this assumption, as is certain to be the case in practice, would further disfavor ITWS.

In addition to maximizing efficiency for a given reactor/material system, knowing $\Delta T_{opt}$ can guide reactor design.

Figure 6:
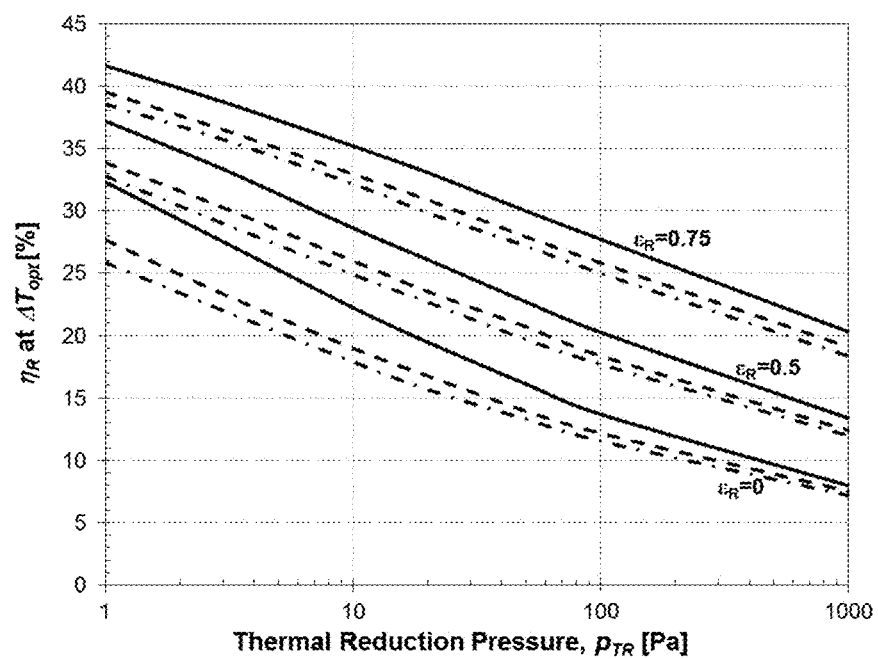
FIG. 6 shows $\eta_R(\Delta T_{opt})$ as function of $p_{TR}$, for several $\varepsilon_R$ and $\varepsilon_{GG}$. The metal oxide in this example is ceria.

FIG. 6 shows calculated reactor efficiencies at $\Delta T_{opt}$ (ranging from 130 K to 460 K) as function of $P_{TR}$. The three groups of lines correspond to three values of $\varepsilon_R$. Within the groups, solid lines correspond to $\varepsilon_{GG}=0.9$, dashed to $\varepsilon_{GG}=0.7$, and dash-dot lines to $\varepsilon_{GG}=0.5$. It is evident that, for a ceria-based reactor operating at $\Delta T_{opt}$, $\varepsilon_R$ influences efficiency more than $\varepsilon_{GG}$ does. For example, increasing $\varepsilon_R$ from 0 to 0.5 allows the same efficiency to be achieved at a roughly 10 times higher $p_{TR}$. This type of plot can be used to help evaluate the cost of achieving a certain $p_{TR}$, $\varepsilon_R$, or $\varepsilon_{GG}$ vs. corresponding efficiency benefits.

SUMMARY

As seen in FIG. 2a, a reactor producing $H_2$ from $H_2O$ in an isothermal two-step cycle, must operate at high thermal reduction temperatures, very low thermal reduction pressures, or at an exceptionally high $n_{w/h}$, or some combination of the three. High operating temperatures place extraordinary demands on reactor materials, and require unrealistically high concentration ratios from the solar collector and concentrator system. Low thermal reduction pressures require very large receivers and pumps—an undertaking of possibly prohibitive cost. Finally, high values of $n_{w/h}$ make water near ambient temperature, not $H_2$, the main reactor product. This necessitates either high temperature $H_2$ separation, or the addition of a high-throughput, high-efficiency steam heat recovery system, which preheats the input water while cooling the output steam-$H_2$ mix. Each of these factors complicate reactor and plant design and compromise economics: Therefore, when the entire balance of plant is considered, ITWS makes matters more difficult, not easier, as one might hope.

Further, in addition to posing extraordinary design and operational demands, ITWS offers no efficiency payoff. On the contrary, it appears to be the most inefficient fashion of producing $H_2$ from $H_2O$ in a two-step cycle (FIGS. 3 and 4). Even in the most favorable case, without solid-solid heat recovery, ITWS with a high level of steam-steam heat recovery ($\varepsilon_{GG}=0.8$), is less efficient than TSWS at $\Delta T_{opt}$ for a far more plausible $\varepsilon_{GG}$–0.6 (FIG. 4). This disadvantage only widens for $\varepsilon_R>0$ or when a realistic $T_{WS}$-dependent $\varepsilon_{GG}$ is included (FIGS. 4 and 5).

Recalling that the question in solar fuel production is not one of feasibility, but of efficient solar utilization and minimization of the product cost, no ITWS advantages are evident in our analysis. Rather, requiring that $T_{TR}=T_{WS}$ seems to be an unnecessary and counterproductive limitation. On the other hand, TSWS at $\Delta T_{opt}$ maximizes solar resource utilization, and the associated low steam requirement simplifies plant design and operation.

The very existence of $\Delta T_{opt}$ may seem peculiar if one thinks of thermochemical reactors as engines that reverse combustion, i.e. where heat is the input and fuel (chemical work) is the output. It may initially appear most plausible that maximizing $\Delta T$ would also maximize efficiency. In the case of perfect heat recovery ($\varepsilon_R=\varepsilon_{GG}=1$), this would be correct. It is because of the reality of non-ideal heat recovery that $\Delta T_{opt}$ exists at all.

Some general implications regarding reactor operation follow from the above results. Under all conditions, the slopes of the efficiency curves are shallower for $\Delta T>\Delta T_{opt}$ than for $\Delta T<\Delta T_{opt}$. Furthermore, the reasons for suboptimal efficiency are different in these two regions. For $\Delta T>\Delta T_{opt}$, the oxide heating requirement results in the production of high quality waste heat (at $T_{WS}$), which can be used elsewhere in the plant, even if not for $H_2$ production directly. For $\Delta T<\Delta T_{opt}$, however, efficiency decreases because of the steam heating requirement, with waste heat available at low temperature (following steam-steam heat recovery) and of little value. This suggests that it may be prudent to err on the side of $\Delta T>\Delta T_{opt}$, rather than the opposite, in order to achieve higher average efficiency under the variable environmental conditions present in practice. Even though the feasibility of thermochemical fuel production using ceria as a working oxide has been demonstrated, a consensus exists regarding the need for material improvements. Most notable of them is the need for a material that provides a higher $\Delta\delta$ at a higher $p_{TR}$ and lower $T_{TR}$ than, for example, ceria, yet with similar kinetics and stability. In addition to the possibility of less demanding operation (at a lower required $T_{TR}$), a higher $\Delta\delta$ would enable higher yields, so that less oxide must be heated per unit produced $H_2$ or fuel in general. Importantly, this increase must not be offset by an equal increase in $C_p$ or more precisely $C_p\Delta T$ (cf. eq. 10 and compare, for example, $C_p$ for ceria with that of $LaMnO_3$ or $La_{1-x}Sr_xMnO_3$). A material that reduces more easily than ceria (larger $\delta$ under identical $T_{TR}$ and $p_{TR}$) will generally also be more difficult to reoxidize, assuming similar and temperature independent values for $\Delta S$. This assumption is justified as $\Delta S$ is largely a function of the evolution of oxygen into the gas phase. Operationally, this suggests that advanced materials may require a lower $T_{WS}$ (larger $\Delta T$) for reoxidation to achieve the same $n_{w/h2}$. In other words, an insufficiently large $\Delta\delta/C_p$ increase could be offset by an increase in the the $2^{nd}$ right-hand term in eq. 5, and therefore decrease efficiency.

Understanding this, it is to be expected that optimal operation with advanced materials is likely to involve an increase of $\Delta T_{opt}$, not its decrease in the direction of ITWS. Precise details would additionally depend on reactor design and various internal efficiencies such as $\varepsilon_R$, $\varepsilon_{GG}$, etc. This also follows from general thermodynamic consideration regarding the maximum theoretical efficiency of a two-step thermochemical process. Because of strict thermodynamic limitations, ITWS is unlikely to benefit from the use of advanced materials.

While some key design and operating parameters of a thermochemical reactor for two-step $H_2$ production present obvious tradeoffs between difficulty and efficiency, $\Delta T$ is not one of them. For example, the higher the degree of heat recovery ($\varepsilon_R$ or $\varepsilon_{GG}$), which is increasingly difficult to accomplish, the higher the efficiency. One must therefore find a balance that minimizes the levelized cost of the $H_2$ product. The choice of $\Delta T$ is easier to make: operating difficulty being largely independent of $\Delta T$, it would always be advantageous to operate at $\Delta T$ for which efficiency is the highest.

Finally, it should be noted that even though much of this analysis is specific to $CeO_2$ as a reactive oxide, it can be applied to any material for which sufficient thermodynamic information is available. With appropriate small adaptations (mainly heat capacity and dissociation coefficients), the analysis can also be applied to the solar-thermochemical production of CO from $CO_2$, with largely the same conclusions.

Lastly, the conditions ($T_{iso}$, $p_{O2}$ and $n_{w/h}$) required for isothermal two-step thermochemical water splitting ($T_{TR}=T_{WS}$) can be determined based on water thermodynamics and are highly mutually dependent: choosing values for any two defines the third. This analysis shows that isothermal water splitting is impractical, being a choice between high thermal reduction temperatures, very low oxygen partial pressures for thermal reduction, or exceptionally high steam requirements (i.e. high separation work)—or some combination of the three.

Isothermal water splitting is substantially less efficient than the same process at $\Delta T>0$. This is true even in the complete absence of solid-solid heat recovery in the latter case, and assuming a high steam heat recovery effectiveness at high temperature. The low efficiency of ITWS is primarily a result of the exceptionally high energy requirement for steam heating in the water splitting step of the cycle.

Given a specific reactor/material combination, an optimal $\Delta T=T_{TR}-T_{WS}$ can be found to maximize efficiency. For reasonable values of process parameters in a ceria-based cycle, this $\Delta T_{opt}$ ranges roughly between 250 K and 400 K, and is expected to increase in well-designed advanced materials.

A combination of pressure and temperature swing, rather than either individually, is by a wide margin the most efficient mode of operation of a two-step cycle thermochemical reactor for hydrogen production. Efficiency being of paramount importance for the practical application of this technology, temperature and pressure swing reactors appear to be the most promising direction for future research and development.

Figure 7:
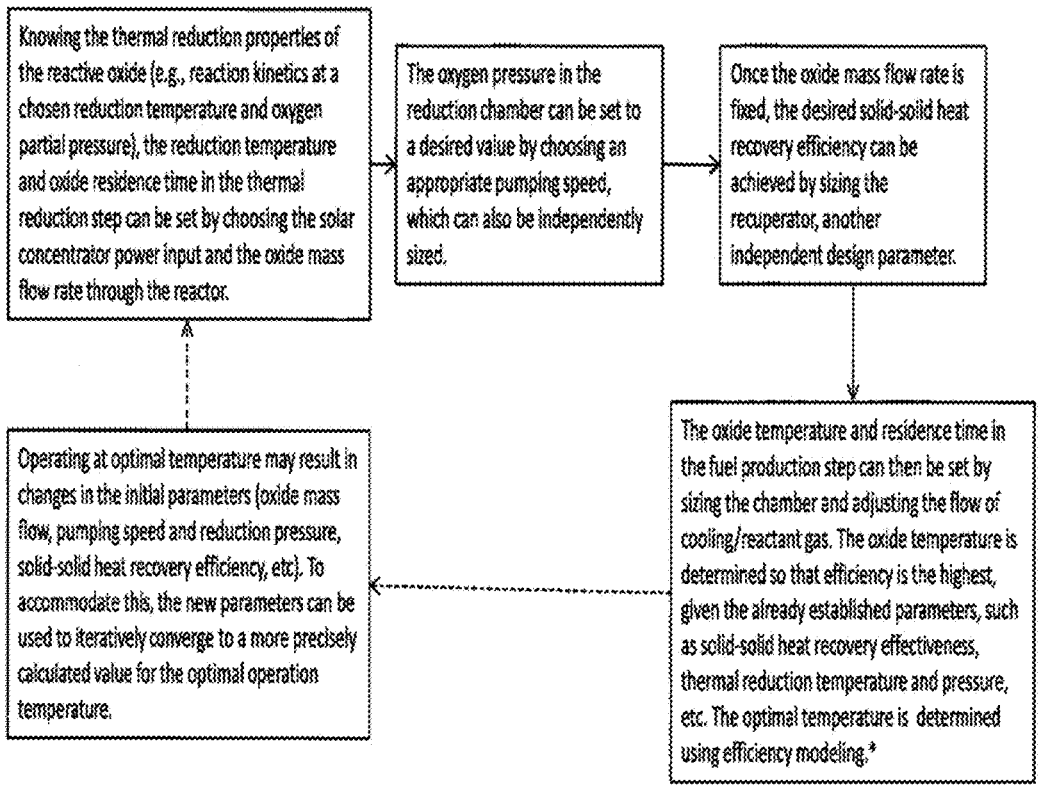
FIG. 7 shows a flow chart of a method of determining the optimal temperature difference between oxidation and reduction for the control of a solar thermochemical process according to an embodiment of the disclosure.

FIG. 7 shows a flow chart of a method of determining the optimal temperature difference between oxidation and reduction for the control of a solar thermochemical process according to an embodiment of the disclosure. In an embodiment, methods are disclosed for determining oxidation and reduction operating temperatures. It has been unexpectedly disclosed that by setting the thermal reduction temperature, pressure and oxide mass flow, and then determining the oxidation temperature where the oxide heating and steam generation heat requirements are equal or approximately equal, peak efficiency of the cycle is attained.

As so described, the artisan will appreciate that with many independent design parameters, a design protocol for the reactors described herein may include first determining thermal reduction properties of the reactive particles (e.g., reaction kinetics at a chosen reduction temperature and oxygen partial pressure). A solar concentrator power, overall particle mass flow rate through the reduction chamber, and feed stock pumping speed may be independently set to establish the desired reduction temperature, pressure, and residence time within the reactor. Similarly, the production temperature, and production residence time may be set by appropriate component sizing and adjusting the flow of the reactant fluid (two more independent parameters).

It is to be understood that the above description is illustrative, and not restrictive. For example, while flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A method for determining an operating oxidation temperature in a thermochemical reactor process, comprising:
    (a) selecting a thermal reduction temperature for a reactive oxide;
    (b) selecting an operating pressure in the thermal reduction step in a containment vessel;
    (c) selecting a solid-solid and a gas-gas recuperation efficiency;
    (d) selecting an initial oxidation temperature for a feed stream having a heat requirement for oxidizing the feed stream;
    (e) iterating/repeating steps (a)-(d) to develop a performance/efficiency map as a function of reduction temperature, temperature swing, pressure swing, and recuperation efficiencies;
    (f) embedding the performance/efficiency map into a solar collection and heating system model to determine the operating oxidation temperature; and
    (g) utilizing the determined operating oxidation temperature in the thermochemical reactor process which comprises thermal reduction, solid-solid heat exchange in a thermal recuperator, $H_2$ production and steam preheating by employing solar radiation to heat and thermally reduce the reactive oxide in a thermal reduction chamber of the reactor, moving the reactive oxide through the recuperator and into an $H_2$ production chamber of the reactor, where the $H_2$ production chamber is operated at the determined operating oxidation temperature by exposing the $H_2$ production chamber to pre-heated steam in a countercurrent flow arrangement, producing $H_2$.

2. The method of claim 1, wherein the thermal reduction temperature is based on materials limitations of the reactive material or containment vessel.

3. The method of claim 1, wherein the thermal reduction temperature is based on thermal receiver performance.

4. The method of claim 1, wherein the thermochemical reactor process is a water splitting process.

5. The method of claim 1, wherein heat requirements for achieving the thermal reduction temperature and the oxide temperature are equal.

6. The method of claim 1, wherein the solar collection and heating system model includes at least one parameter selected from a group consisting of the solar field, receiver, and secondary concentrators.

7. The method of claim 1, wherein the operating pressure is oxygen partial pressure at the thermal reduction temperature.

8. A method for determining an operating oxidation temperature in a thermochemical reactor process, comprising:
  (a) selectLng a thermal reduction temperature for a reactive oxide;
  (b) selecting an operating pressure in the thermal reduction step in a containment vessel;
  (c) selecting a solid-solid and a gas-gas recuperation efficiency;
  (d) selecting an initial oxidation temperature for a feed stream having a heat requirement for oxidizing the feed stream;
  (e) iterating/repeating steps (a)-(d) to develop a performance/efficiency map as a function of reduction temperature, temperature swing, pressure swing, and recuperation efficiencies;
  (f) embedding the performance/efficiency map into a system cost model to determine a configuration of process system components that result in the largest amount of stored chemical energy per unit of capital cost;
  wherein the operating oxidation temperature is determined at a temperature at which the largest amount of stored chemical energy per unit capital cost is achieved; and
  (g) utilizing the determined operating oxidation temperature in the thermochemical reactor process which comprises thermal reduction, solid-solid heat exchange in a thermal recuperator, $H_2$ production and steam pre-heating by employing solar radiation to heat and thermally reduce the reactive oxide in a thermal reduction chamber of the reactor, moving the reactive oxide through the recuperator and into an $H_2$ production chamber of the reactor, where the $H_2$ production chamber is operated at the determined operating oxidation temperature by exposing the $H_2$ production chamber to pre-heated steam in a countercurrent flow arrangement, producing $H_2$.

9. The method of claim 7, wherein the process system components comprise thermal recuperation components.

10. The method of claim 7, wherein the thermal reduction temperature is based on materials limitations of the reactive material or containment vessel.

11. The method of claim 7, wherein the thermal reduction temperature is based on thermal receiver performance.

12. The method of claim 7, wherein the thermochemical reactor process is a water splitting process.

13. The method of claim 7, wherein heat requirements for achieving the thermal reduction temperature and the oxide temperature are equal.

14. The method of claim 7, wherein the operating pressure is oxygen partial pressure at the thermal reduction temperature.

* * * * *